US009098498B2

(12) United States Patent
Alexeev (10) Patent No.: US 9,098,498 B2
(45) Date of Patent: Aug. 4, 2015

(54) ELECTRONIC TRANSACTIONS WITH MOBILE COMMUNICATIONS DEVICES VIA ENCODED GRAPHICAL REPRESENTATIONS (75) Inventor: Valentin Alexeev, St. Petersburg (RU)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/114,552

(22) PCT Filed: May 19, 2011

(86) PCT No.: PCT/RU2011/000337
§ 371 (c)(1),
(2), (4) Date: Oct. 30, 2013

(87) PCT Pub. No.: WO2012/158058
PCT Pub. Date: Nov. 22, 2012

(65) Prior Publication Data
US 2014/0054367 A1 Feb. 27, 2014

(51) Int. Cl.
*G06F 17/00* (2006.01)
*G06F 17/30* (2006.01)
*G06Q 20/32* (2012.01)

(52) U.S. Cl.
CPC ............. *G06F 17/30* (2013.01); *G06Q 20/32* (2013.01); *G06Q 20/3274* (2013.01); *G06Q 20/3276* (2013.01)

(58) Field of Classification Search
CPC .... G06F 17/30; G06Q 20/32; G06Q 20/3274; G06Q 20/3276
USPC ................... 235/375, 376, 462.01, 462.15
See application file for complete search history.

(56) References Cited

U.S. PATENT DOCUMENTS 6,607,136 B1  8/2003  Atsmon et al.
8,261,982 B2 * 9/2012  Oestreicher et al. .......... 235/385
(Continued)

FOREIGN PATENT DOCUMENTS

EP    2073160        6/2009
JP    2002042031 A   2/2002
(Continued)

OTHER PUBLICATIONS

Kato, H. et al.; 2D Barcodes for Mobile Phones; Mobile Technology, Applications and Systems, 2005 2nd International Conference on Guangzhou, China Nov. 14-17, 2005, Piscataway, NJ, USA, IEEE, Piscataway, NJ; USA; Nov. 15, 2005; pp. 1-8; XP010926841; ISBN: 978-981-5-4573-4.
(Continued)

*Primary Examiner* — Seung Lee
(74) *Attorney, Agent, or Firm* — Chiesa Shahinian & Giantomasi (57) ABSTRACT

Information is exchanged between a mobile communications device and an automated information system. In one embodiment, the mobile communications device is equipped with a video display and a digital camera, and the automated information system is equipped with a video display and a graphical representation receiver. The automated information system displays a first graphical representation encoded with a first dataset. The mobile communications device captures an image of the first graphical representation, decodes the first dataset, processes the first dataset, generates a second dataset, encodes the second dataset in a second graphical representation, and displays the second graphical representation. The automated information system receives the second graphical representation, decodes the second dataset, and processes the second dataset. Examples of graphical representations include barcodes.

30 Claims, 11 Drawing Sheets

(56) References Cited

U.S. PATENT DOCUMENTS

| | | |
|---|---|---|
| 2005/0049732 A1 | 3/2005 | Kanevsky et al. |
| 2005/0085188 A1 | 4/2005 | Ishii et al. |
| 2005/0211771 A1 | 9/2005 | Onozu |
| 2007/0022058 A1 | 1/2007 | Labrou et al. |
| 2010/0012715 A1 | 1/2010 | Williams et al. |
| 2011/0101086 A1 | 5/2011 | Yach |

FOREIGN PATENT DOCUMENTS

| | | |
|---|---|---|
| JP | 2005122729 A | 5/2005 |
| JP | 2005127511 A | 5/2005 |
| JP | 2005276023 A | 10/2005 |
| JP | 2006268446 A | 10/2006 |
| JP | 2008269186 A | 11/2008 |
| WO | 0245273 A2 | 6/2002 |
| WO | 2004002103 A1 | 12/2003 |

OTHER PUBLICATIONS

International Search Report and Written Opinion mailed Jan. 31, 2012, in connection with international patent application No. PCT/RU2011/000337, 9 pgs.

International Search Report and Written Opinion mailed Feb. 2, 2012, in connection with international patent application No. PCT/RU2011/000335, 9 pgs.

Office Action issued on Mar. 10, 2015, and mailed on Mar. 16, 2015, in connection with Japanese Patent Application No. 2014-511318, 5 pgs.

\* cited by examiner

1-D BARCODE (UPC)

FIG. 11A  ~1102

2-D BARCODE (QR)

FIG. 11B  ~1104

2-D GRAPHICAL REPRESENTATION

FIG. 11C  ~1106

ELECTRONIC TRANSACTIONS WITH MOBILE COMMUNICATIONS DEVICES VIA ENCODED GRAPHICAL REPRESENTATIONS

BACKGROUND OF THE INVENTION

The present invention relates generally to electronic transactions, and more particularly to electronic transactions with mobile communications devices.

Electronic transaction systems have been widely deployed for business applications. A common example of an electronic transaction system is an electronic payment system with which a user pays for goods or services. Widely-deployed and well-established electronic payment systems utilize a credit card with an embedded magnetic strip containing encoded user account information. The magnetic strip is swiped through a magnetic card reader connected to a point-of-sale terminal that decodes the user account information. Sales information (such as merchant identification code, transaction identification code, date, time, and price) and user account information are transmitted to an electronic payment processing center that charges the purchase to the user account.

More recent electronic payment systems utilize a card or tag with user account information stored in a memory chip and transmitted by a radiofrequency (RF) transmitter. A point-of-sale terminal equipped with a RF receiver reads the user account information when the RF transmitter is placed near the RF receiver.

Another example of an electronic transaction system is an electronic ticket system. A user can purchase a ticket to an event (such as a sports game, play, or concert) via the Internet and print a ticket containing a ticket identification number encoded in a barcode. At the event, the barcode is scanned by a barcode reader that transmits the ticket identification number to an electronic ticket processing center.

Electronic ticket systems can also generate electronic boarding passes. A user can purchase an airplane ticket via the Internet and print a ticket containing a boarding pass with boarding information encoded in a barcode. At the boarding gate of the airline terminal, the barcode is scanned by a barcode reader that transmits the boarding information to an electronic boarding pass processing center.

In the electronic ticket systems described above, a user typically accesses the Internet via a computer, purchases the tickets, and prints out the barcodes on paper. Mobile phones with video displays and Internet connectivity have become widely available. A user can now access the Internet via a mobile phone, purchase a ticket, and display a barcode on the video display. The barcode can then be read by a conventional barcode reader. Although a paper copy of the barcode is eliminated in this procedure, the actual purchase of the ticket is still processed through the vendor's website. What is needed is an electronic transaction system to dynamically process transactions.

BRIEF SUMMARY OF THE INVENTION

In an embodiment, information is exchanged between a mobile communications device and an automated information system. The mobile communications device is equipped with a video display and a digital camera, and the automated information system is equipped with a video display and a graphical representation receiver. The automated information system displays a first graphical representation encoded with a first dataset. The mobile communications device captures an image of the first graphical representation, decodes the first dataset, processes the first dataset, generates a second dataset, encodes the second dataset in a second graphical representation, and displays the second barcode. The automated information system receives the second graphical representation, decodes the second dataset, and processes the second dataset. Embodiments of graphical representations include barcodes.

These and other advantages of the invention will be apparent to those of ordinary skill in the art by reference to the following detailed description and the accompanying drawings.

DETAILED DESCRIPTION

Figure 1:
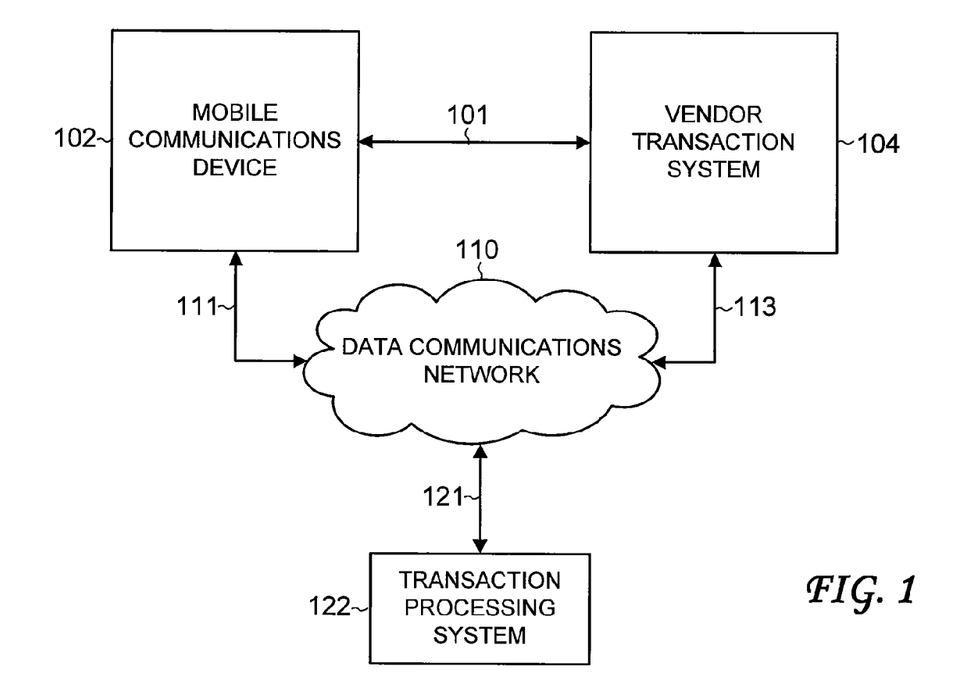
FIG. 1 shows a schematic of an electronic transaction system.

FIG. 1 shows a high-level functional block diagram of an electronic transaction system. The electronic transaction system includes a mobile communications device 102 and a vendor transaction system 104. Examples of the mobile communications device 102 include a mobile phone, a personal digital assistant, and a laptop computer. Examples of the vendor transaction system 104 include a point-of-sale terminal at a store and a check-in kiosk at an airport. In some embodiments, the vendor transaction system 104 is a mobile communications device similar to the mobile communications device 102. A vendor transaction system configured as a mobile communications device is advantageous, for example, for processing tickets at the entrance of stadiums or theaters, for processing payments at a table in a restaurant, and for processing payments at outdoor markets.

The mobile communications device 102 and the vendor transaction system 104 communicate with each other via a data communications link 101. The mobile communications device 102 communicates with a data communications network 110 via a data communications link 111. The vendor transaction system 104 communicates with the data communications network 110 via a data communications link 113. A transaction processing system 122 communicates with the data communications network 110 via a data communications link 121.

The transaction processing system 122 performs back-end operations such as authentication, authorization, record-keeping, and billing. For simplicity, the transaction processing system 122 is shown as a single network element. In practice, the transaction processing system 122 can include multiple network elements operated by multiple parties, such as credit card companies, security clearing houses, transaction brokers, and telecommunications services providers.

For simplicity, a single data communications link is shown between the various network elements in FIG. 1. In practice, two network elements can be coupled by multiple data communications links. Further details of the data communications link 101 are described below. The data communications link 111 typically is an RF link to a cellular telephone network. The data communications link 113 and the data communications link 121 can be wireless links or fixed-line links (such as wire, coaxial cable, or optical fiber).

Figure 2:
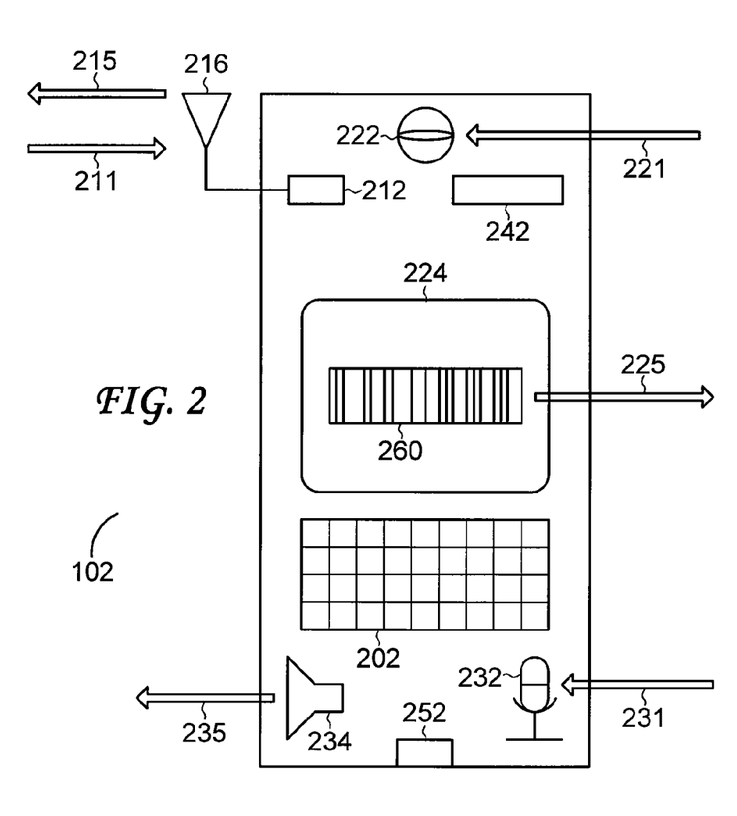
FIG. 2 shows a schematic of a mobile communications device.

FIG. 2 shows a schematic diagram of an embodiment of the mobile communications device 102. The mobile communications device 102 includes a user input device 202 (such as a keypad or a touchscreen) for receiving user input. The mobile communications device 102 includes a digital camera 222 for receiving images 221 and a video display 224 for displaying images 225. In general, both still images and video images can be captured and displayed.

The mobile communications device 102 includes an acoustic receiver (microphone) 232 for receiving acoustic signals 231 and an acoustic transmitter (speaker) 234 for transmitting acoustic signals 235.

The mobile communications device 102 includes a RF transceiver 212 that receives RF signals 211 and transmits RF signals 215 via an antenna 216. For simplicity, a single RF transceiver is shown. In general, the RF transceiver 212 represents multiple RF transceivers or a multi-mode RF transceiver. For example, the RF transceiver 212 can communicate with mobile telecommunications networks [such as Universal Mobile Telecommunications Systems (UMTS) and code division multiple access (CDMA)], wireless local area networks (such as WiFi), short-range RF networks (such as Bluetooth), and near-field communications networks (such as used for RF identification devices).

The mobile communications device 102 includes an auxiliary port 252, which can, for example, be a wired port or an infrared port. In some embodiments, auxiliary port 252 is a Universal Serial Bus (USB) port. The auxiliary port 252 can be used to transfer data to and from the mobile communications device 102 and to interface the mobile communications device 102 with auxiliary devices (such as barcode readers).

The mobile communications device 102 includes a computational system 242, further details of which are described below. The computational speed and capacity integrated into the class of mobile phones referred to as smartphones has increased sufficiently that the distinction between a mobile phone and a mobile computer has blurred. The mobile communications device 102 can execute general-purpose programs and specialized programs. Various categories of specialized programs are referred to as applets or apps.

FIG. 2 shows one embodiment of a mobile communications device. One skilled in the art would recognize that other embodiments of mobile communications devices can include fewer or more components.

Figure 3:
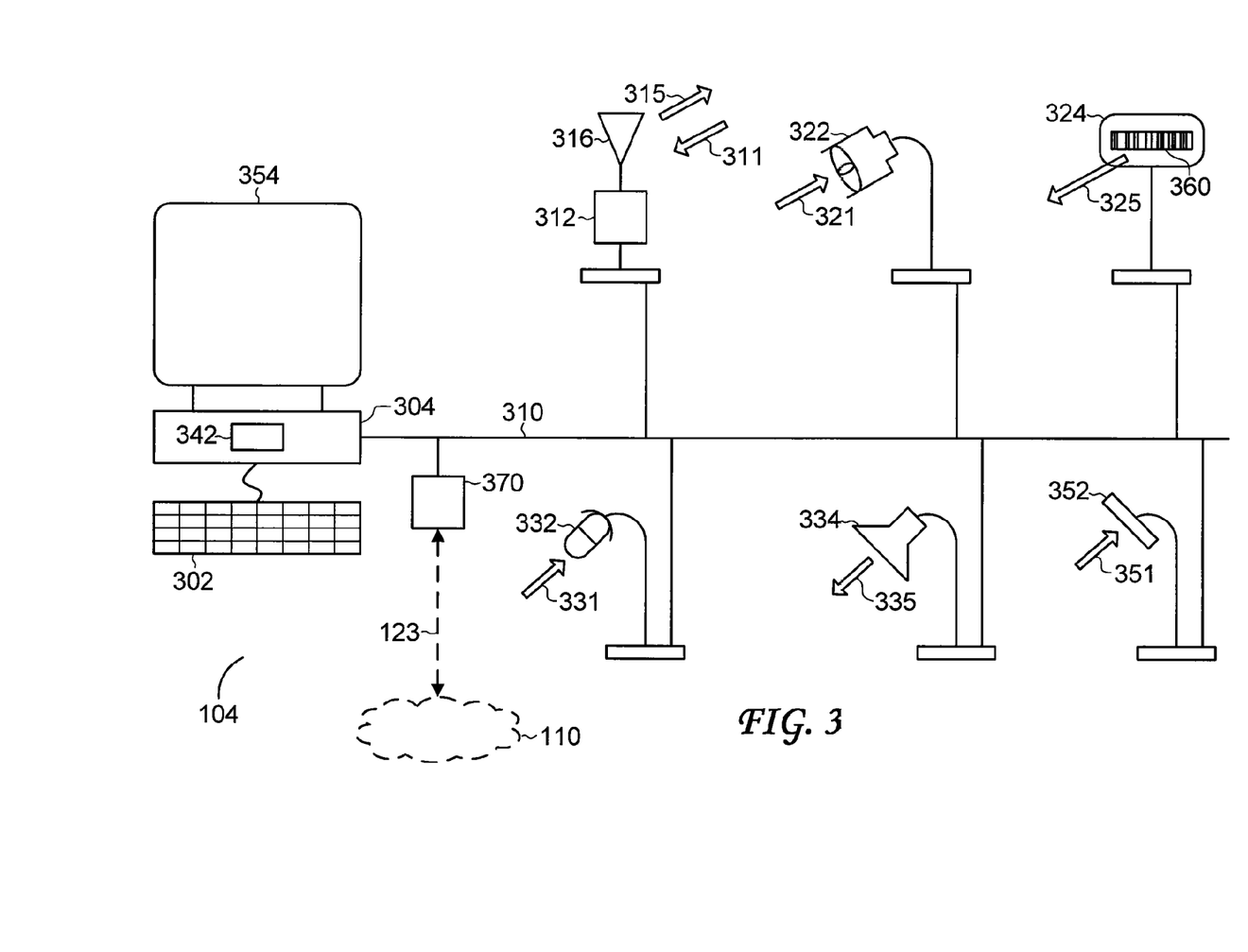
FIG. 3 shows a schematic of a vendor transaction system.

FIG. 3 shows a schematic diagram of an embodiment of the vendor transaction system 104. The vendor transaction system 104 includes a point-of-sale (POS) terminal 304 with a user input device 302 (such as a keyboard) and a video display 354. A computational system 342 resides within the POS terminal 304. Further details of the computational system 342 are described below. In other embodiments, the computational system does not reside within the POS terminal 304; the POS terminal 304 communicates with a computational system via a data interface, data communications bus, or data communications network.

In the embodiment shown in FIG. 3, various input/output devices communicate with the POS terminal 304 via a data communications bus 310, such as a Universal Serial Bus. In other embodiments, various input/output devices communicate with the POS terminal 304 via a local area network (such as an Ethernet network) or via individual interfaces.

The POS terminal 304 communicates with data communications network 110 via a data network hub 370 (such as an Ethernet hub). The POS terminal 304 receives images 321 via a digital camera 322 and displays images 325 via a video display 324. Images 325 can also be displayed on the video display 354; however, since the video display 354 is often accessible only to the operator of the POS terminal 304, the video display 324 is configured to be readily accessible to the customer. The POS terminal 304 receives acoustic signals 331 via an acoustic receiver (microphone) 332 and transmits acoustic signals 335 via an acoustic transmitter (speaker) 334. The POS terminal 304 can communicate with other input/output devices. For example, a barcode reader 352 receives optical signals 351.

The POS terminal 304 communicates with a RF transceiver 312 that receives RF signals 311 and transmits RF signals 315 via an antenna 316. For simplicity, a single RF transceiver is shown. In general, the RF transceiver 312 represents multiple RF transceivers or a multi-mode RF transceiver. For example, the RF transceiver 312 can communicate with wireless local area networks (such as WiFi), short-range RF networks (such as Bluetooth), and near-field communications networks (such as used for RF identification devices).

FIG. 3 shows one embodiment of a vendor transaction system. One skilled in the art would recognize that other embodiments of vendor transaction systems can include fewer or more components.

Figure 4:
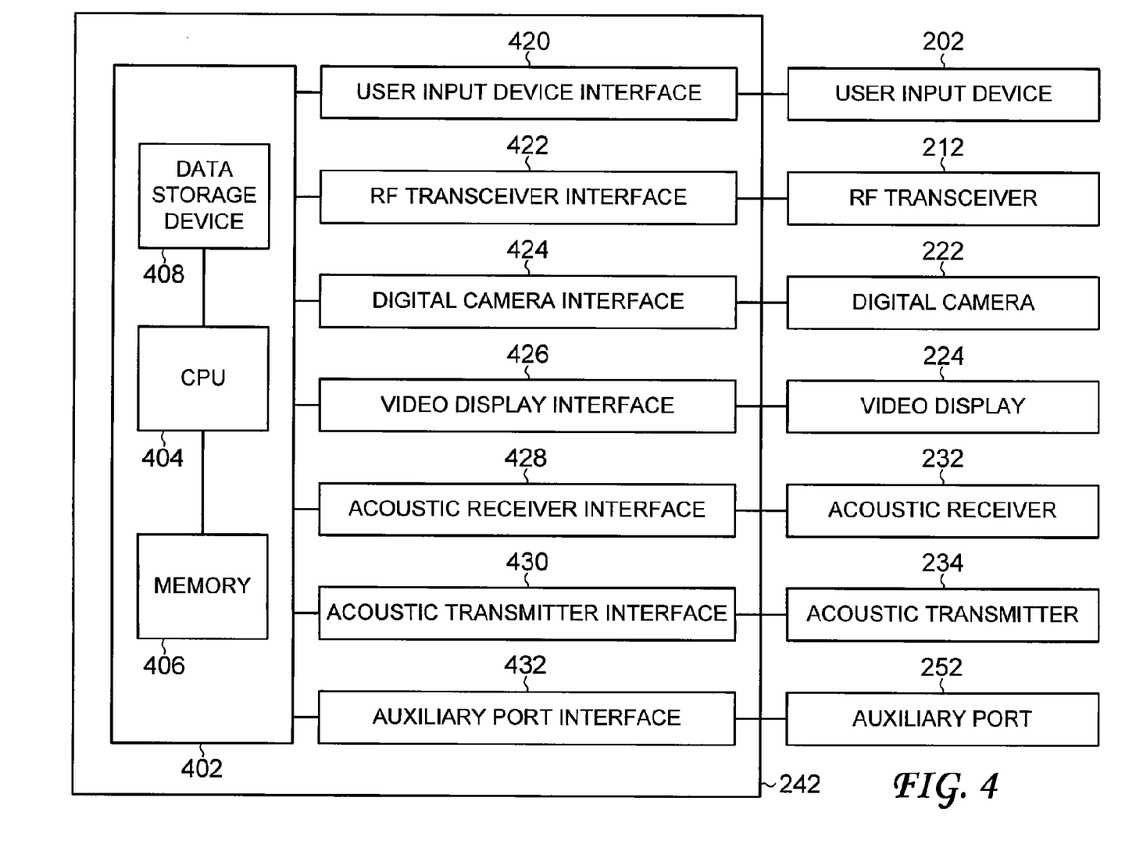
FIG. 4 shows a schematic of a computational system incorporated in a mobile communications device.

An embodiment of the computational system 242 in the mobile communications device 102 (FIG. 2) is shown schematically in FIG. 4. One skilled in the art can construct the computational system 242 from various combinations of hardware, firmware, and software. One skilled in the art can construct the computational system 242 from various electronic components, including one or more general purpose microprocessors, one or more digital signal processors, one or more application-specific integrated circuits (ASICs), and one or more field-programmable gate arrays (FPGAs).

The computational system 242 includes a computer 402, which includes a central processing unit (CPU) 404, memory 406, and a data storage device 408. The data storage device 408 includes at least one persistent, non-transitory, tangible computer readable medium, such as non-volatile semiconductor memory or a magnetic hard drive. In some embodiments, the data storage device 408 is a removable flash memory card.

The computational system 242 further includes a user input device interface 420, which interfaces the computer 402 with the user input device 202; a RF transceiver interface 422, which interfaces the computer 402 with the RF transceiver 212; a digital camera interface 424, which interfaces the computer 402 with the digital camera 222; a video display interface 426, which interfaces the computer 402 with the video display 224; an acoustic receiver interface 428, which interfaces the computer 402 with the acoustic receiver 232; an acoustic transmitter interface 430, which interfaces the computer 402 with the acoustic transmitter 234; and an auxiliary port interface 432, which interfaces the computer 402 with the auxiliary port 252.

Figure 5:
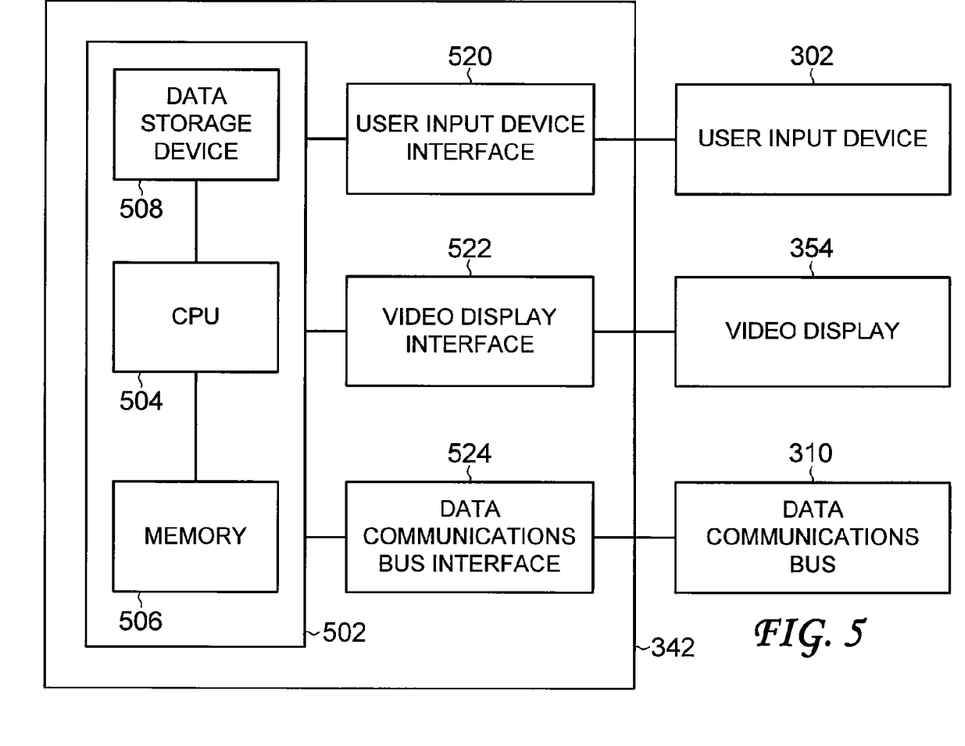
FIG. 5 shows a schematic of a computational system incorporated in a vendor transaction system.

An embodiment of the computational system 342 in the vendor transaction system 104 (FIG. 3) is shown schematically in FIG. 5. One skilled in the art can construct the computational system 342 from various combinations of hardware, firmware, and software. One skilled in the art can construct the computational system 342 from various electronic components, including one or more general purpose microprocessors, one or more digital signal processors, one or more application-specific integrated circuits (ASICs), and one or more field-programmable gate arrays (FPGAs).

The computational system 342 includes a computer 502, which includes a central processing unit (CPU) 504, memory 506, and a data storage device 508. The data storage device 508 includes at least one persistent, non-transitory, tangible computer readable medium, such as non-volatile semiconductor memory or a magnetic hard drive.

The computational system 342 further includes a user input device interface 520, which interfaces the computer 502 with the user input device 302; a video display interface 522, which interfaces the computer 502 with the video display 354; and a data communications bus interface 524, which interfaces the computer 502 with the data communications bus 310. Data can be received by the computational system 342 via a data input device (not shown) coupled to the data communications bus 310. Data can be sent from the computational system 342 via a data output device (not shown) coupled to the data communications bus 310. An example of a combined data input/output device is the data network hub 370 (FIG. 3).

As is well known, a computer operates under control of computer software, which defines the overall operation of the computer and applications. For the computational system 242 (FIG. 4), the CPU 404 controls the overall operation of the computer 402 and applications by executing computer program instructions that define the overall operation and applications. The computer program instructions can be stored in the data storage device 408 and loaded into the memory 406 when execution of the program instructions is desired. The algorithms shown schematically as method steps in the flowcharts of FIG. 8A and FIG. 8B below can be defined by computer program instructions stored in the memory 406 or in the data storage device 408 (or in a combination of the memory 406 and the data storage device 408) and controlled by the CPU 404 executing the computer program instructions. For example, the computer program instructions can be implemented as computer executable code programmed by one skilled in the art to perform algorithms. Accordingly, by executing the computer program instructions, the CPU 404 executes the algorithms shown schematically as method steps in the flowcharts of FIG. 8A and FIG. 8B.

For the computational system 342 (FIG. 5), the CPU 504 controls the overall operation of the computer 502 and applications by executing computer program instructions that define the overall operation and applications. The computer program instructions can be stored in the data storage device 508 and loaded into the memory 506 when execution of the program instructions is desired. The algorithm shown schematically as method steps in the flowchart of FIG. 7 below can be defined by computer program instructions stored in the memory 506 or in the data storage device 508 (or in a combination of the memory 506 and the data storage device 508) and controlled by the CPU 504 executing the computer program instructions. For example, the computer program instructions can be implemented as computer executable code programmed by one skilled in the art to perform algorithms. Accordingly, by executing the computer program instructions, the CPU 504 executes the algorithm shown schematically as method steps in the flowchart of FIG. 7.

Figure 6:
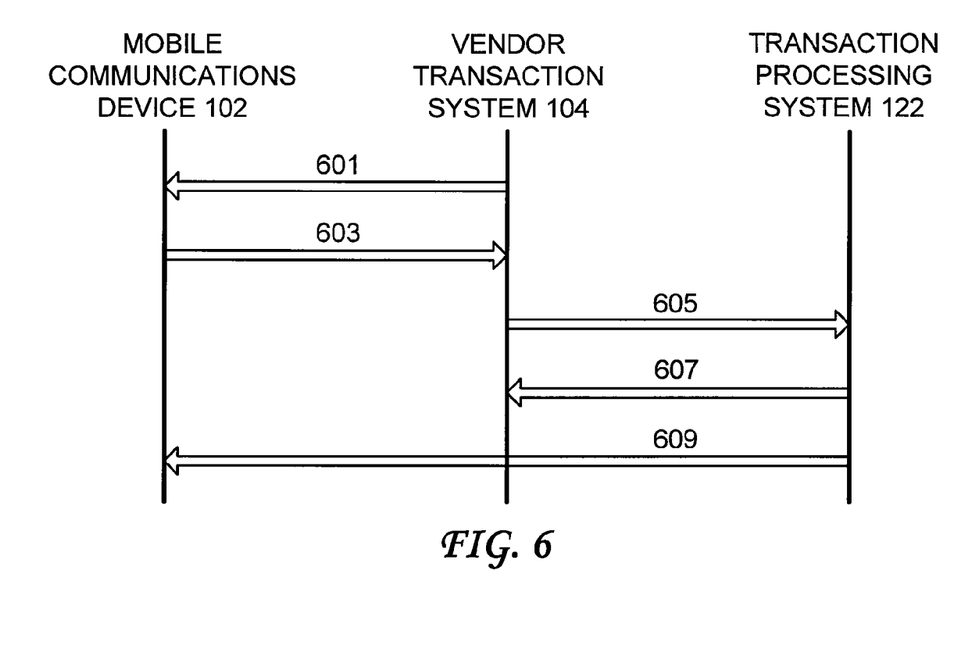
FIG. 6 shows a message flow diagram for an electronic transaction.

FIG. 6 shows a message flow diagram for an example of an electronic payment transaction. The electronic payment transaction involves three network elements, as shown previously in FIG. 1: the mobile communications device 102 (operated by a customer), the vendor transaction system 104 (operated by a vendor), and the transaction processing system 122 (operated by a transaction processing service provider).

A customer purchases goods from a vendor. The vendor processes the sales transaction data at the POS terminal 304 (FIG. 3) and sends a message 601 from the vendor transaction system 104 to the mobile communications device 102. The modes of transmission are discussed in detail below. The message 601 includes billing information, such as a transaction identification number, a vendor identification number, the date, the time, a list of goods sold, and the prices.

After the message 601 has been received, the mobile communications device 102 (FIG. 2) processes the message 601 and displays a bill on the video display 224. The customer then enters payment instructions via the user input device 202. The mobile communications device 102 sends a message 603 to the vendor transaction system 104. The message 603 includes payment information, such as the customer's name, credit card account number, and security code.

After the message 603 has been received, the vendor transaction system 104 processes the message 603 and sends a message 605 to the transaction processing system 122. The message 605 includes vendor information, customer information, and information pertaining to the particular transaction.

After the message 605 has been received, the transaction processing system 122 processes the message 605, looks up additional merchant information and customer information from a database, and performs authentication checks. If the transaction fails the authentication checks, the transaction processing system 122 denies the transaction. If the transaction passes the authentication checks, the transaction processing system 122 authorizes the transaction. The transaction processing system 122 then sends a message 607 to the vendor transaction system 104. The message 607 includes transaction processing information, such as authorization status (denied or authorized) and a transaction authorization identification number. In some embodiments, the transaction processing system 122 also sends a message 609 to the mobile communications device 102. The content of message 609 is similar to that of message 607. In some embodiments, the transaction processing system 122 sends messages to the mobile communications device 102 via the vendor transaction system 104.

In some embodiments, messages are checked for errors and retransmitted if needed. In some embodiments, messages are encrypted before they are sent and decrypted after they are received. In some embodiments, the messages are authenticated (for example, the identity of a sender is verified by a third party).

Referring to FIG. 3, in an embodiment, the POS terminal 304 encodes the message 601 in a barcode 360, an image of which is displayed on the video display 324. Depending on the amount of information to be transmitted, the barcode can be a one-dimensional (1-D) barcode, such as a Universal Product Code (UPC) 1102 (FIG. 11A) or an International Article Number Code (EAN), or a two-dimensional (2-D)

barcode, such as a Quick Response (QR) Code 1104 (FIG. 11B) or a Data Matrix Code. For simplicity, barcode 360 is depicted as a 1-D barcode.

In an embodiment, when the size of a message exceeds the data capacity of one barcode, the message is encoded into multiple barcodes. The multiple barcodes can be sent in series or in parallel.

Barcode 360 is then received by the mobile communications device 102 (FIG. 2): the digital camera 222 captures an image of the barcode 360. The mobile communications device 102 then decodes the message 601 from the barcode 360 (for example, via appropriate image processing software), processes the message 601, and displays a bill on the video display 224 to the customer. The customer then enters payment instructions via the user input device 202. The mobile communications device 102 processes the payment instructions, generates the message 603, encodes the message 603 in a barcode 260, and displays an image of the barcode 260 on the video display 224.

The barcode 260 is then received by the vendor transaction system 104 (FIG. 3): the barcode 260 can be scanned by the barcode reader 352 or an image of the barcode 260 can be captured by the digital camera 322. The POS terminal 304 decodes the message 603 from the barcode 260, processes the message 603, and transmits the message 605 to the transaction processing system 122 via the data communications network 110 (FIG. 1). The transaction processing system 122 receives the message 605, processes the message 605, and sends the message 607 to the vendor transaction system 104 via the data communications network 110. The transaction processing system 122 also sends the message 609 to the mobile communications device 102 via the data communications network 110. For example, the message 609 can be delivered via a cellular telephone network.

In another embodiment, messages between the mobile communications device 102 and the vendor transaction system 104 are encoded in acoustic signals. The POS terminal 304 acoustically encodes message 601 in acoustic signals 335, which are transmitted by the acoustic transmitter 334 (FIG. 3). The acoustic signals 335 are received by the acoustic receiver 232 in the mobile communications device 102 (FIG. 2). Similarly, the mobile communications device 102 acoustically encodes message 603 in acoustic signals 235, which are transmitted by the acoustic transmitter 234. The acoustic signals 235 are received by the acoustic receiver 332 in the vendor transaction system 104 (FIG. 3). The acoustic signals are carried on acoustic waves transmitted between an acoustic transmitter and an acoustic receiver.

Figure 7:
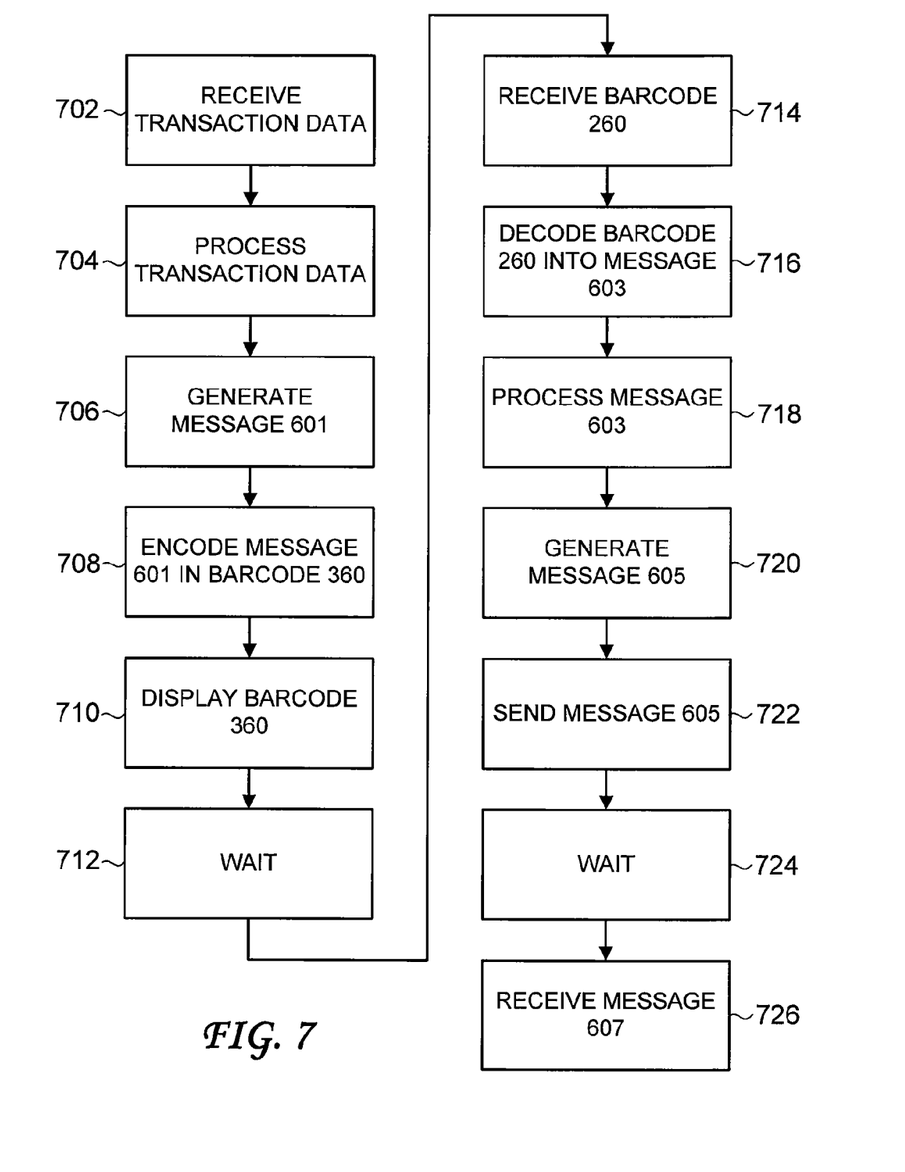
FIG. 7 shows a flowchart of steps performed by a vendor transaction system during an electronic transaction.

FIG. 7 shows a flowchart of steps performed by the vendor transaction system 104 in one embodiment of an electronic transaction process. Transaction data is received in step 702 and processed in step 704. The message 601 is generated in step 706 and is encoded in the barcode 360 in step 708. The barcode is displayed in step 710. The process then passes to step 712, in which the vendor transaction system 104 waits for a response from the mobile communications device 102.

In step 714, the vendor transaction system 104 receives the barcode 260, which is decoded into message 603 in step 716. The message 603 is processed in step 718. The message 605 is generated in step 720 and sent in step 722. The process then passes to step 724, in which the vendor transaction system 104 waits for a response from the transaction processing system 122. In step 726, the vendor transaction system 104 receives the message 607.

Figure 8A:
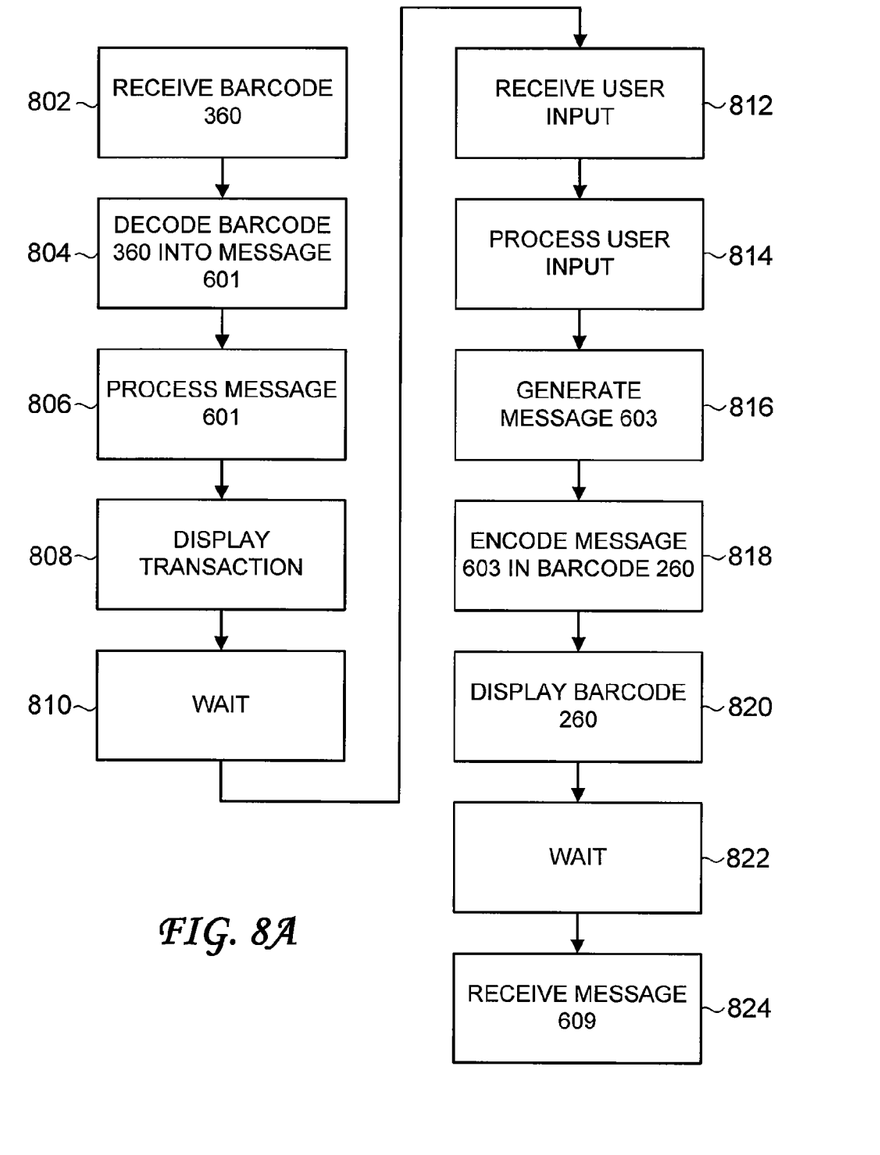
FIG. 8A and FIG. 8B show flowcharts of steps performed by a mobile communications device during an electronic transaction.

FIG. 8A shows a flowchart of steps performed by the mobile communications device 102 in one embodiment of an electronic transaction process. In step 802, the mobile communications device 102 receives the barcode 360, which is decoded into the message 601 in step 804. In step 806, the message 601 is processed, and a transaction is displayed in step 808. The process then passes to step 810, in which the mobile communications device 102 waits for user input.

In step 812, the mobile communications device 102 receives user input, which is processed in step 814. The message 603 is generated in step 816 and encoded in the barcode 260 in step 818. The barcode 260 is displayed in step 820. The process then passes to step 822, in which the mobile communications device 102 waits for a response from the transaction processing system 122. In step 824, the mobile communications device 102 receives the message 609.

Figure 8B:
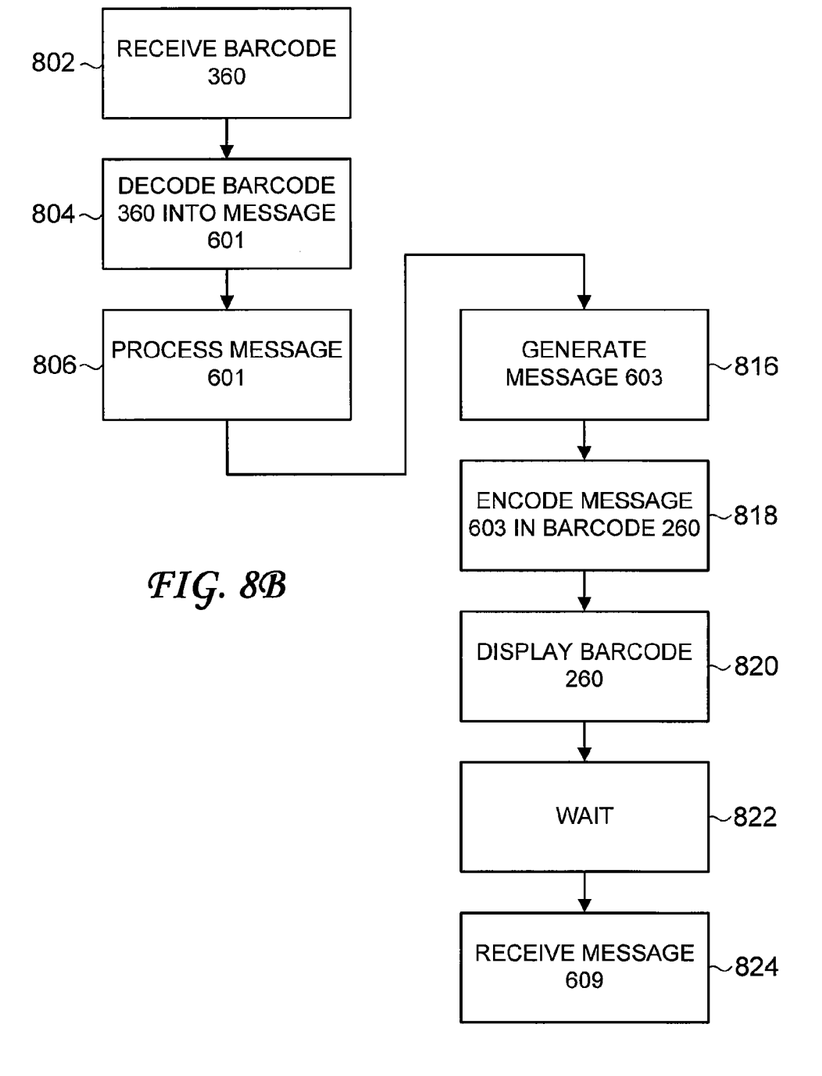

FIG. 8B shows a flowchart of steps performed by the mobile communications device 102 in another embodiment of an electronic transaction process. In this process, step 808—step 814 in FIG. 8A are omitted. No user input is required to complete the transaction (for example, if the price of the transaction is less than a user-defined threshold value).

In step 802, the mobile communications device 102 receives the barcode 360, which is decoded into the message 601 in step 804. In step 806, the message 601 is processed. The process then passes to step 816, in which the message 603 is automatically generated by the mobile communications device 102 in response to the message 601. The message 603 is encoded in the barcode 260 in step 818, and the barcode 260 is displayed in step 820. The process then passes to step 822, in which the mobile communications device 102 waits for a response from the transaction processing system 822. In step 824, the mobile communications device 102 receives the message 609.

As described above, a message can be encoded into multiple barcodes. In an embodiment, in step 708 (FIG. 7), message 601 is encoded into multiple barcodes. The multiple barcodes can be displayed in parallel or in series in step 710 before the vendor transaction system 104 enters the wait state in step 712. Message 601 can also be encoded into a combination of barcodes and other graphical elements [including text and images that are not barcodes (such as drawings or pictures)]. In an embodiment, in step 802 (FIG. 8A and FIG. 8B), multiple barcodes or a combination of barcodes and other graphical elements are received in parallel or in series. The barcodes are then decoded in step 804.

The mobile communications system 102 can similarly encode a message into multiple barcodes or a combination of barcodes and other graphical elements (in parallel or in series), and the vendor transaction system 104 can receive multiple barcodes or a combination of barcodes and other graphical elements (in parallel or in series).

Figure 9:
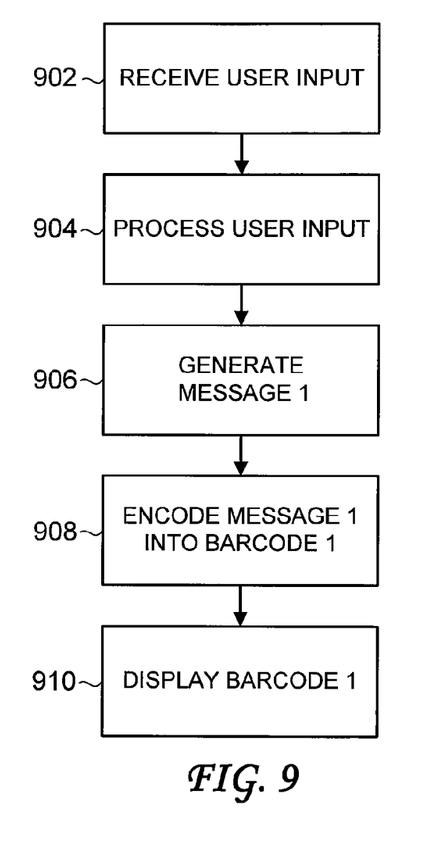
FIG. 9 shows a flowchart of steps performed by a mobile communications device during an electronic query.
Figure 10:
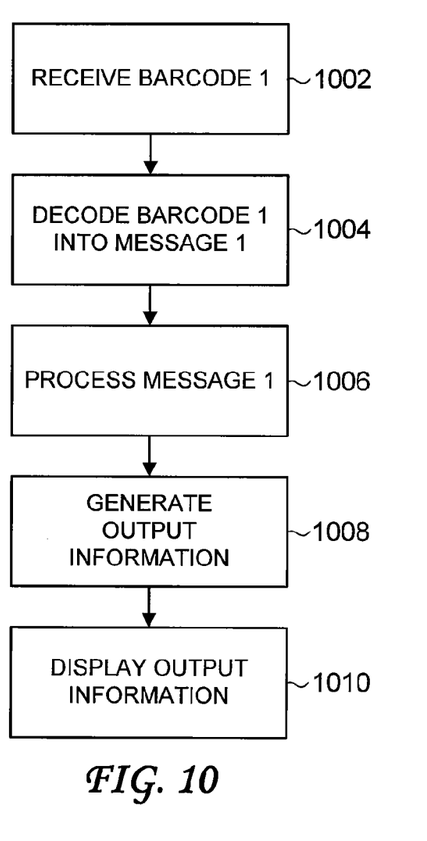
FIG. 10 shows a flowchart of steps performed by an automated information system during an electronic query.

The electronic transactions described above were electronic payments. In general, an electronic transaction refers to an electronic exchange of information. FIG. 9 and FIG. 10 show flowcharts of steps for an electronic transaction in which a user queries an automated information system for directions.

FIG. 9 shows a flowchart of steps performed by a mobile communications device. In step 902, the mobile communications device receives user input (in this example, a query for directions). The user input is processed in step 904; and a message 1, containing the query, is generated in step 906 and encoded in barcode 1 in step 908. In step 910, an image of the barcode 1 is displayed on the video display of the mobile communications device.

FIG. 10 shows a flowchart of steps performed by an automated information system. The automated information system is equipped with a barcode reader; an automated information system can also include a digital camera. As discussed above, a second mobile communications device can be used for an automated information system. In step 1002, the user positions the video display of the mobile communications device under the barcode reader, and the automated information system receives the barcode 1. In step 1004, the barcode 1 is decoded into the message 1, which is processed in step 1006. In step 1008, the automated information system generates the output information (in this example, the requested directions), and displays the output information in step 1010.

The automated information system is equipped with a video display. The output information can be displayed in various ways. In one example, the output information is encoded in a barcode 2, which is then captured by a digital camera in the mobile communications device. In an embodiment, after the mobile communications device has received, decoded, and processed the barcode 2, it can respond with a barcode 3, which contains a query for further information. In another example, directions in text and a graphical map are displayed on the video display of the automated information system.

Note that an information exchange session can also be initiated by a mobile communications device capturing an image of a barcode displayed by the automated information system. Subsequent information exchanges between the mobile communications device and the automated information system can then follow as needed.

Information exchanges via barcodes are typically uni-directional; for example, a barcode reader at a supermarket checkout counter reads a barcode on a product, or a mobile phone reads a barcode on a vendor's advertisement. In embodiments of the invention described herein, information exchanges via barcodes can be bi-directional.

Various information can be encoded in a barcode. Examples of information range in complexity from numeric to alphanumeric to complex symbols such as kanji to generic data encoded in bits. Herein, the information encoded in a barcode is referred to as a dataset. Herein, a dataset is generated by a data source. Herein, a dataset decoded from a barcode is referred to as a regenerated dataset. A dataset can be received by communications devices and transaction systems via a user input device for manual input and via a data input device for automatic input from a data communications link. A dataset can be sent by communications devices and transaction systems via a data output device for automatic output to a data communications link.

The amount of information that can be encoded in a barcode depends on various parameters. Examples of parameters include: (a) Dimensionality. A two-dimensional barcode can store more information than a one-dimensional barcode. (b) Physical Size. A larger barcode can store more information than a smaller barcode. (c) Resolution. A barcode is formed from graphical elements; higher resolution permits a higher density of graphical elements. For a barcode of a given physical size, a barcode with higher resolution can store more information than a barcode with lower resolution. (d) Coding Scheme. Some coding schemes are more efficient than others. As discussed above, multiple barcodes can be used to increase information storage capacity.

A small physical size is advantageous for many applications, and, often, the information storage capacity of a barcode is limited by the resolution of the graphical elements from which it is formed. Traditionally, barcodes have been images printed on substrates such as paper or film, and resolution has been limited by the printing process and the substrate surfaces. Resolution is also limited by the scanners used to read the barcodes.

More recently, barcodes can be displayed as images on a video display. As the resolution of video displays (even in mobile phones) increases, the storage capacity of a barcode can increase. A high-resolution barcode, of course, requires a corresponding high-resolution reader. Instead of a traditional scanner, a high-resolution image of a barcode can be captured by a high-resolution digital camera (even in mobile phones) and decoded by image processing software.

Herein, barcodes include physical barcodes and images of barcodes. A physical barcode is formed from graphical elements generated on a substrate; for example, a physical barcode can be printed as dots of ink on a sheet of paper or etched as structures on a metal film. An image of a barcode is formed from graphical elements (such as pixels) displayed on a video display. Herein, devices and systems "receive a barcode" either as the output of a barcode scanner or as an image of a barcode captured by a digital camera. A barcode scanner can scan both physical barcodes and images of barcodes. A digital camera can capture images of both physical barcodes and images of barcodes displayed on a video display. Herein, "barcode receivers" refer to barcode scanners and digital cameras.

The information stored in a barcode can itself be the final information desired by a user; for example, the identification of a product, a list of items purchased, and a ticket authorization code. The information stored in a barcode, however, can also launch software applications stored in a device or system. For example, a mobile phone can capture an image of a barcode on a vendor's advertising display. The decoded information is a set of instructions that launches a web browser on the mobile phone and logs onto the vendor's website. A small quantity of information stored in a barcode can therefore execute complex processes.

Figure 11A:
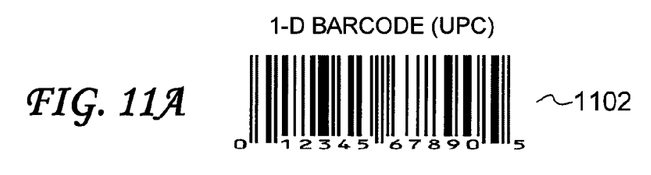
FIG. 11A shows an example of a one-dimensional barcode.
Figure 11B:
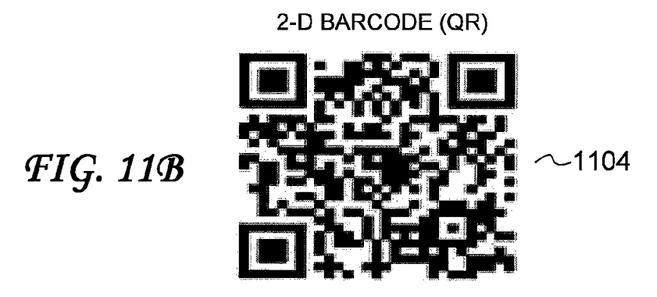
FIG. 11B shows an example of a two-dimensional barcode.

Initially, barcodes referred to one-dimensional (1-D) barcodes that were formed from a series of bars (straight line segments) arranged along a line; see, for example, 1-D barcode (UPC) 1102 in FIG. 11A. With two-dimensional barcodes, however, there is greater flexibility in the graphical elements that form the two-dimensional barcodes; see, for example, 2-D barcode (QR) 1104 in FIG. 11B. Commonly used barcodes are specified by industry standards, and different versions have been developed.

Figure 11C:
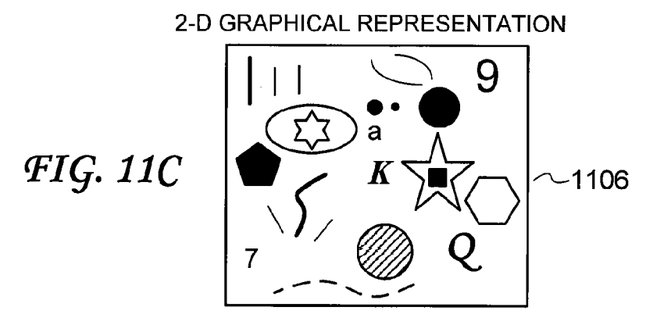
FIG. 11C shows an example of a generalized two-dimensional graphical representation.

In a generalization of barcodes, datasets can be encoded in a one-dimensional or two-dimensional graphical representation formed from graphical elements. The graphical elements are not limited to bars. Various parameters of the graphical elements, such as shape, size, orientation, density, and geometrical configuration can be user defined. For example, instead of straight line segments, the graphical elements can be dots, arcs, curvilinear line segments, circles, ellipses, triangles, squares, rectangles, and polygons, and other user-defined geometrical figures. Geometrical figures such as circles and squares can be filled (either solid or patterned) or unfilled. FIG. 11C shows an example of a generalized 2-D graphical representation 1106. In general, the coding schemes can be user defined. Note that barcodes are a subset of graphical representations.

Graphical representations can evolve into new industry standards or be maintained as proprietary protocols (for example, for secret encoding). Herein, graphical representations include physical graphical representations and images of graphical representations. A physical graphical representation is formed from graphical elements generated on a substrate; for example, a physical graphical representation can be printed as dots of ink on a sheet of paper or etched as structures on a metal film. An image of a graphical representation is formed from graphical elements (such as pixels) displayed on a video display. Herein, devices and systems "receive a graphical representation" either as the output of a graphical representation scanner or as an image of a graphical representation captured by a digital camera. A graphical representation scanner can scan both physical graphical representations and images of graphical representations. A digital camera can capture images of both physical graphical representations and images of graphical representations displayed on a video display. Herein, "graphical representation receivers" refer to graphical representation scanners and digital cameras. In embodiments of the invention, the various examples of information exchanges performed via barcodes (as described above) are performed via graphical representations with appropriate hardware and software.

As discussed above, in reference to FIG. 1, FIG. 2, and FIG. 3, messages can be exchanged between the mobile communications device 102 and the vendor transaction system 104 via acoustic signals carried on acoustic waves. Various methods for digital modulation of acoustic signals are well-known in the art and are not described herein. In general, a dataset can be generated by a data source and encoded in an acoustic signal. The dataset can be regenerated by decoding the acoustic signal. The various examples of information exchanges performed via barcodes can be performed via acoustic signals. Information exchanges via acoustic signals are advantageous, for example, for mobile communications devices not equipped with a video display and a digital camera. To transmit acoustic signals from a mobile communications device to a vendor transaction system (or automated information system), the speaker on the mobile communications device is placed near the microphone on the vendor transaction system (or automated information system). To transmit acoustic signals from a vendor transaction system (or automated information system) to a mobile communications device, the microphone on the mobile communications device is placed near the speaker on the vendor transaction system (or automated information system). As discussed above, a second mobile communications device can be used for a vendor transaction system (or automated information system).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for exchanging information at a mobile communications device, the method comprising the steps of:
   receiving at least one first graphical representation comprising a first dataset;
   decoding the at least one first graphical representation to regenerate the first dataset, the first dataset comprising billing information;
   generating a second dataset based at least in part on the regenerated first dataset, the second dataset comprising payment instructions;
   encoding the second dataset in at least one second graphical representation; and
   displaying at least one image of the at least one second graphical representation.

2. The method of claim 1, wherein the at least one first graphical representation comprises at least one first barcode.

3. The method of claim 1, wherein the at least one second graphical representation comprises at least one second barcode.

4. The method of claim 1, further comprising the step of:
   receiving user input based at least in part on the regenerated first dataset.

5. The method of claim 4, wherein the step of generating a second dataset based at least in part on the regenerated first dataset further comprises the step of:
   generating the second dataset based at least in part on the regenerated first dataset and based at least in part on the received user input.

6. The method of claim 1, further comprising the step of:
   receiving at least one third graphical representation comprising a third dataset, the third dataset based at least in part on the at least one image of the at least one second graphical representation.

7. The method of claim 6, wherein the at least one third graphical representation comprises at least one third barcode.

8. A method for exchanging information, the method comprising the steps of:
   receiving a first dataset comprising billing information;
   encoding the first dataset in at least one first graphical representation;
   displaying at least one image of the at least one first graphical representation;
   receiving at least one second graphical representation comprising a second dataset, the second dataset comprising payment information and based at least in part on the at least one image of the at least one first graphical representation; and
   decoding the second graphical representation to regenerate the second dataset.

9. The method of claim 8, wherein the at least one first graphical representation comprises at least one first barcode.

10. The method of claim 8, wherein the at least one second graphical representation comprises at least one second barcode.

11. The method of claim 8, further comprising the steps of:
    generating a third dataset based at least in part on the regenerated second dataset;
    encoding the third dataset in at least one third graphical representation; and
    displaying at least one image of the at least one third graphical representation.

12. The method of claim 11, wherein the at least one third graphical representation comprises at least one third barcode.

13. The method of claim 8, further comprising the steps of:
    receiving user input based at least in part on the regenerated second dataset;
    generating a third dataset based at least in part on the regenerated second dataset and based at least in part on the received user input;
    encoding the third dataset in at least one third graphical representation; and
    displaying at least one image of the at least one third graphical representation.

14. The method of claim 13, wherein the at least one third graphical representation comprises at least one third barcode.

15. A mobile communications device comprising:
    a radiofrequency transceiver operatively coupled to a computational system;
    a digital camera operatively coupled to the computational system;

a video display operatively coupled to the computational system;

wherein the computational system is configured to:
communicate through the radiofrequency transceiver with a mobile telecommunications network;
receive from the digital camera at least one image of at least one first graphical representation comprising a first dataset, the first dataset including billing information;
decode the at least one first graphical representation to regenerate the first dataset;
generate a second dataset based at least in part on the regenerated first dataset, the second dataset including payment information;
encode the second dataset in at least one second graphical representation; and
display on the video display at least one image of the at least one second graphical representation.

16. The mobile communications device of claim 15, wherein the at least one first graphical representation comprises at least one first barcode.

17. The mobile communications device of claim 15, wherein the at least one second graphical representation comprises at least one second barcode.

18. The mobile communications device of claim 15, further comprising a user input device operatively coupled to the computational system.

19. The mobile communications device of claim 18, wherein the computational system is further configured to:
receive user input from the user input device; and
generate the second dataset based at least in part on the regenerated first dataset and based at least in part on the received user input.

20. The mobile communications device of claim 15, wherein the computational system is further configured to:
receive from the digital camera at least one image of at least one third graphical representation comprising a third dataset, the third dataset based at least in part on the at least one image of the at least one second graphical representation.

21. The mobile communications device of claim 20, wherein the at least one third graphical representation comprises at least one third barcode.

22. An automated information system comprising:
a data input device operatively coupled to a computational system;
a video display operatively coupled to the computational system;
a graphical representation receiver operatively coupled to the computational system;
wherein the computational system is configured to:
receive from the data input device a first dataset, the first dataset including billing information;
encode the first dataset in at least one first graphical representation;
display on the video display at least one image of the at least one first graphical representation;
receive from the graphical representation receiver at least one second graphical representation, wherein the at least one second graphical representation comprises a second dataset, the second dataset including payment information and based at least in part on the at least one image of the at least one first graphical representation; and
decode the at least one second graphical representation to regenerate the second dataset.

23. The automated information system of claim 22, wherein the at least one first graphical representation comprises at least one first barcode.

24. The automated information system of claim 22, wherein the at least one second graphical representation comprises at least one second barcode.

25. The automated information system of claim 22, further comprising a radiofrequency transceiver operatively coupled to the computational system.

26. The automated information system of claim 22, wherein the computational system is further configured to:
generate a third dataset based at least in part on the regenerated second dataset;
encode the third dataset into at least one third graphical representation; and
display on the video display at least one image of the at least one third graphical representation.

27. The automated information system of claim 26, wherein the at least one third graphical representation comprises at least one third barcode.

28. The automated information system of claim 22, further comprising a user input device operatively coupled to the computational system.

29. The automated information system of claim 28, wherein the computational system is further configured to:
receive from the user input device user input based at least in part on the regenerated second dataset;
generate a third dataset based at least in part on the regenerated second dataset and based at least in part on the received user input;
encode the third dataset into at least one third graphical representation; and
display on the video display at least one image of the at least one third graphical representation.

30. The automated information system of claim 29, wherein the at least one third graphical representation comprises at least one third barcode.

* * * * *